United States Patent Office 2,876,125
Patented Mar. 3, 1959

2,876,125

COMPOSITION OF MATTER AND METHOD OF MAKING

Walter M. Miley, Worthington, Stuart B. Hughes, Columbus, and Robert L. High, Canal Winchester, Ohio, assignors to National Industrial Products Company, Columbus, Ohio, a corporation of Ohio No Drawing. Application June 10, 1957
Serial No. 664,478

6 Claims. (Cl. 106—213)

The inventions disclosed in this application relate to new compositions of matter and methods of preparing them. They are illustrated by compositions of matter useful as laundry starches and by methods for their formulation.

One of the objects of this invention is the provision of new compositions of matter.

A further more specific object of the invention is the provision of a new composition of matter useful as a laundry starch.

A further object of the invention is the provision of new methods of preparing a liquid starch useful as a laundry starch.

Further objects and features of the invention will be apparent from a reading of the following specification and claims.

We have discovered a new composition of matter useful as an improved laundry starch. One formulation thereof consists of the following:

(1) 75 lbs. of 18 oz. modified thin boiling (87 fluidity) wheat starch.
(2) 50 lbs. of 10 oz. modified (60 fluidity) cornstarch.
(3) 6 lbs. of sodium chloride.
(4) 2 lbs. of sulfonated castor oil.
(5) 6.89 oz. of para chloro meta xylenol.
(6) 2.5 oz. of polyoxyethylene stearate.
(7) 300 mils of cold methanol.

Sufficient water to bring the total mixture to 100 gallons (about 800 lbs.).

In preparing an improved laundry starch from the above materials we mix the wheat starch and sodium chloride together with the 2.5 oz. of polyoxyethylene stearate dissolved in the 2 lbs. of sulfonated oil all together in about 50 gallons of water. The mixture is brought to a boil and held at boiling temperature for 20 minutes. This temperature partially cooks the starch. Following the cook, the batch is allowed to cool until it reaches a temperature of about 100° F., the mixture being continuously agitated during the cooling period. Immediately thereafter we add the 60 fluidity cornstarch together with the para chloro meta xylenol dissolved in the methanol. We also add sufficient cold water (i. e. about 800 lbs.) to bring the mix up to 100 gallons. We then agitate for from 16 to 20 hours after which we bottle the liquid for distribution and use.

The finished product has a low viscosity giving a fast mixing with either wheel water or rinse water. Even when undiluted it does not show any signs of component separation over considerable periods of time. It may be used in commercial laundries for starching wearing apparel or flat work either for wheel operation or for hand dipping operation. Experimental plant runs have been made in several laundries. These runs were highly successful. The product may also be used in home laundries by adding the starch during the last rinsing cycle.

The sulfonated oil may be sulfonated castor oil. It may be sulfonated oleic acid or any equivalent thereof. It and the methanol are used as solvents.

Any suitable preservative—fungicide or germicide—can be used although of course any material likely to cause skin irritation should be avoided. In the formulation set out above we have specified para chloro meta xylenol. The following together with many others are useable:

(1) Pentachloro phenate.
(2) Sodium ortho phenyl phenol.
(3) 2,4,5-trichloro phenate.
(4) Sodium 2,3,4,6 tetra chloro phenate.
(5) 2,3,4,6-tetra chloro phenol.
(6) 2,4,6-trichloro phenol.
(7) 2,4,5-trichloro phenol.
(8) 2-chloro-4-phenyl phenol.
(9) Monoethanol ammonium salt of 2-mercapto benzo thiazole.

We have used a brand called "Ottasept" which is a para chloro meta xylenol, a product of Ottawa Chemical Company of Toledo, Ohio.

The wheat starch which we have used is a thin boiling starch having a fluidity of 87. It has been manufactured from raw wheat starch by sulfuric acid until it is an 18-oz. starch. That is, it has a Scott viscosity of about 45 (i. e. 43–47) at 18 oz. to the gallon. The 60 fluidity cornstarch is also a modified starch. It is a 10-oz. starch having a Scott viscosity of 43–47 at 10 oz. to the gallon.

The polyoxyethylene stearate is an important element of the composition and is important in the process. We have used a brand called "Myrj 45" manufactured by the Atlas Powder Company. "Myrj 45" has a formula of

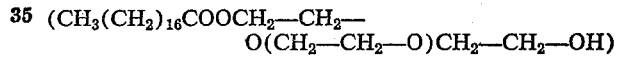

$$CH_3(CH_2)_{16}COOCH_2—CH_2—O(CH_2—CH_2—O)CH_2—CH_2—OH)$$

The polyoxyethylene stearate causes the starch to swell but not to rupture thus giving us an excellent liquid starch for laundry purposes.

It is to be understood that the above described embodiments of our invention are for the purpose of illustration only and various changes may be made therein without departing from the spirit and scope of our invention.

We claim:

1. A composition of matter consisting of the following ingredients in substantially the following quantities:

75 lbs. wheat starch modified to constitute a thin boiling starch
50 lbs. cornstarch modified to constitute a thin boiling starch
6 lbs. sodium chloride
2 lbs. sulfonated castor oil
6.89 oz. of para chloro meta xylenol
2.5 oz. of polyoxyethylene stearate
Sufficient water to bring the total quantity to 100 gallons.

2. A liquid laundry starch comprising about 125 lbs. of starch, about 6 lbs. sodium chloride, about 0.156 lb. of polyoxyethylene stearate and about 800 lbs. of water.

3. A method of forming a liquid laundry starch which comprises mixing wheat starch modified to constitute a thin boiling starch with sodium chloride and polyoxyethylene stearate in water; and boiling.

4. A method of forming a liquid laundry starch which comprises mixing wheat starch modified to constitute a thin boiling starch with sodium chloride and polyoxyethylene stearate in water; boiling; cooling and adding cornstarch modified to constitute a thin boiling starch.

5. A method of liquefying starch which comprises mixing a relatively large proportion by weight of said starch in water with a relatively small proportion of polyoxyethylene stearate.

6. A starch mixture for laundry purposes comprising about 95% starch, about 4.5% sodium chloride and about 0.1% polyoxyethylene stearate.

References Cited in the file of this patent

UNITED STATES PATENTS

| | | |
|---|---|---|
| 649,210 | Petersen | May 8, 1900 |
| 984,330 | Weingartner | Feb. 14, 1911 |
| 2,028,189 | Bowbly | Jan. 21, 1936 |
| 2,174,760 | Schuette et al. | Oct. 3, 1939 |
| 2,283,044 | Caesar | May 12, 1942 |
| 2,548,646 | Bicknell | Apr. 10, 1951 |
| 2,581,058 | Wise | Jan. 1, 1952 |

FOREIGN PATENTS

| | | |
|---|---|---|
| 110,211 | Australia | Mar. 21, 1940 |

OTHER REFERENCES

Favor et al.: Cereal Chem., 24, 346–55 (1947). (Copy in Sci. Libr.)